(12) United States Patent
Flores et al.

(10) Patent No.: US 9,909,685 B1
(45) Date of Patent: Mar. 6, 2018

(54) BATHTUB CHILD SAFETY KNOB COVER

(71) Applicants: Francisco Flores, Cotulla, TX (US); Allison Luna, Scotts Bluff, NE (US)

(72) Inventors: Francisco Flores, Cotulla, TX (US); Allison Luna, Scotts Bluff, NE (US)

( * ) Notice: Subject to any disclaimer, the term of this patent is extended or adjusted under 35 U.S.C. 154(b) by 0 days.

(21) Appl. No.: 15/437,863

(22) Filed: Feb. 21, 2017

(51) Int. Cl.
*A47K 3/02* (2006.01)
*F16K 35/04* (2006.01)

(52) U.S. Cl.
CPC .......... *F16K 35/04* (2013.01); *A47K 2201/00* (2013.01)

(58) Field of Classification Search
CPC ............................. F16K 35/04; A47K 2201/00
USPC ............................................................. 4/580
See application file for complete search history.

(56) References Cited

U.S. PATENT DOCUMENTS

| | | | | |
|---|---|---|---|---|
| 2,610,877 A * | 9/1952 | Weaver | ................. | E05B 13/001 16/82 |
| 3,306,643 A * | 2/1967 | Reed | ..................... | E05B 13/001 16/402 |
| 4,082,351 A * | 4/1978 | Chrones | ................ | E05B 13/001 16/414 |
| 4,301,828 A * | 11/1981 | Martin, Jr. | ............. | B60K 15/05 137/381 |
| 4,353,139 A | 10/1982 | Wainwright | | |
| 5,588,316 A | 12/1996 | Jones | | |
| 5,590,682 A | 1/1997 | Fischer | | |
| 5,956,808 A | 9/1999 | Tom | | |
| 6,145,534 A * | 11/2000 | Romero | .................. | E03C 1/041 137/377 |
| 6,205,598 B1 | 3/2001 | Black | | |
| 6,371,155 B1 * | 4/2002 | Balocca | .................. | E03C 1/041 137/377 |
| D465,009 S | 10/2002 | Siefken | | |
| 2011/0100486 A1 | 5/2011 | Brewton, III | | |

FOREIGN PATENT DOCUMENTS

WO 03019060 A1 3/2003

* cited by examiner

*Primary Examiner* — Huyen Le
(74) *Attorney, Agent, or Firm* — Kyle A. Fletcher, Esq.

(57) ABSTRACT

The bathtub child safety knob cover is a safety device that covers the knob for a water valve associated with a bath tub. The bathtub child safety knob cover fits over the knob in such a manner that the bathtub child safety knob cover will rotate around the knob unless the bathtub child safety knob cover is squeezed while being turned. The bathtub child safety knob cover comprises a shell and one or more decorative elements. The shell encloses the knob. The one or more decorative elements are placed on the shell.

11 Claims, 4 Drawing Sheets

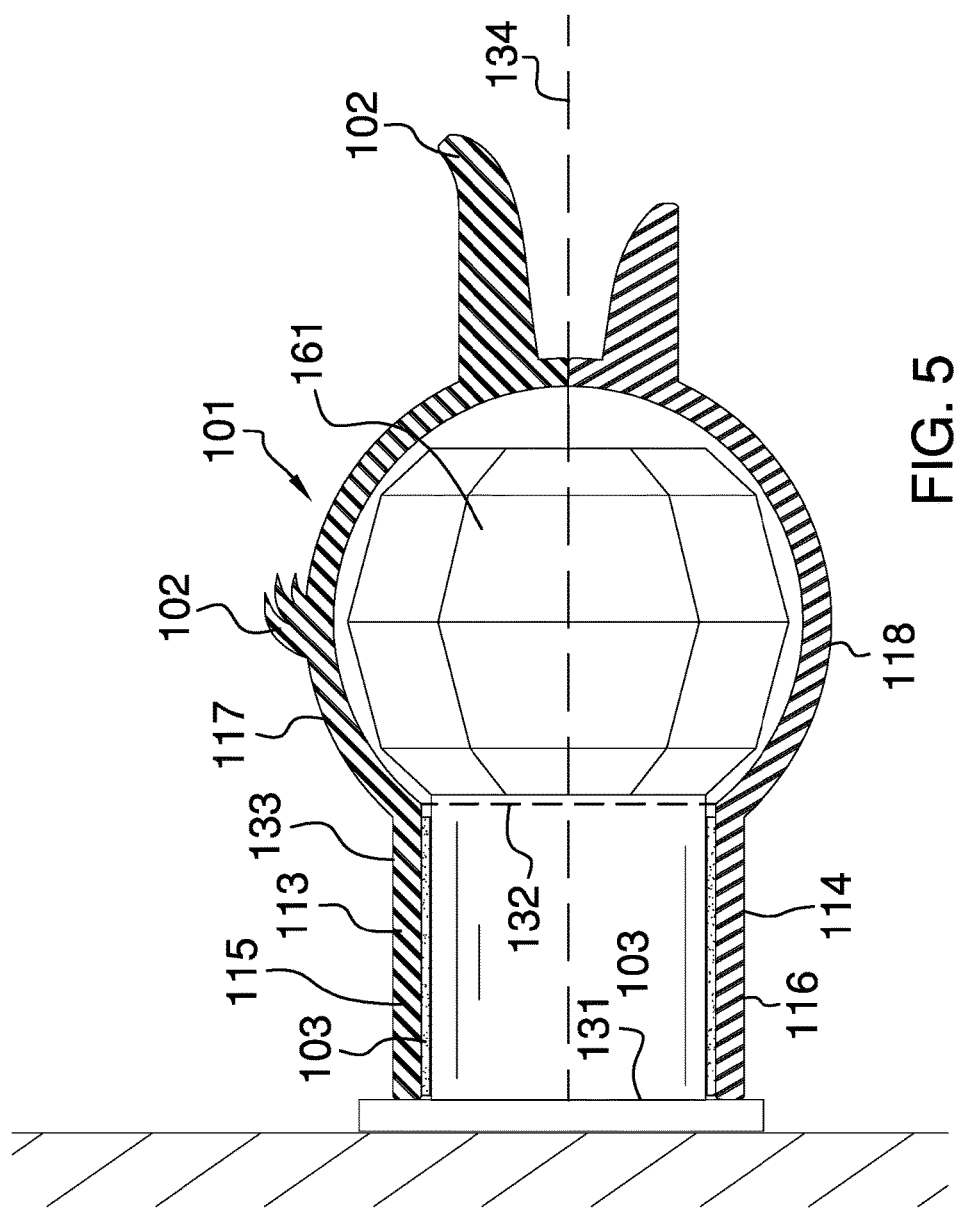

BATHTUB CHILD SAFETY KNOB COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of general engineering including valves and taps, more specifically, a means to prevent unauthorized or accidental actuation of a valve.

SUMMARY OF INVENTION

The bathtub child safety knob cover is a safety device that covers the knob for a water valve associated with a bath tub. The bathtub child safety knob cover fits over the knob in such a manner that the bathtub child safety knob cover will rotate around the knob unless the bathtub child safety knob cover is squeezed while being turned. The bathtub child safety knob cover comprises a shell and one or more decorative elements. The shell encloses the knob. The one or more decorative elements are placed on the shell.

These together with additional objects, features and advantages of the bathtub child safety knob cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the bathtub child safety knob cover in detail, it is to be understood that the bathtub child safety knob cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bathtub child safety knob cover.

It is therefore important that the claims be regarded as including such equivalent construction insofar as they do not depart from the spirit and scope of the bathtub child safety knob cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a cross-sectional view of an embodiment of the disclosure.

DETAILED DESCRIPTION OF THE EMBODIMENT

Figure 1:
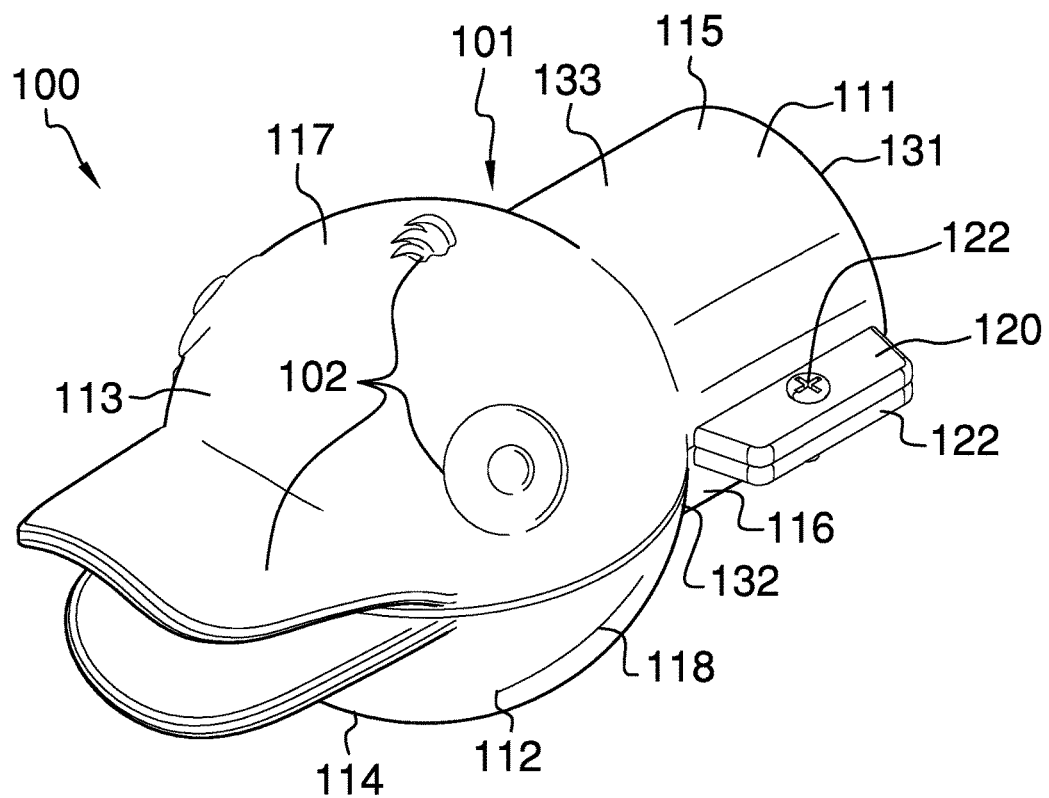
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The bathtub child safety knob cover 100 (hereinafter invention) comprises a shell 101 and one or more decorative elements 102. The shell 101 encloses the knob 161. The one or more decorative elements 102 are placed on the shell 101. The invention 100 is a safety device that covers the knob 161 for a water valve associated with a bath tub. The invention 100 fits over the knob 161 in such a manner that the invention 100 will rotate around the knob 161 unless the invention 100 is squeezed while being turned.

The shell 101 comprises a cylindrical shell 111 and a spherical shell 112. The cylindrical shell 111 is a hollow cylindrical semi-rigid structure that is further defined with a first base 131, a second base 132, and a face 133. The first base 131 and the second base 132 are open. The spherical shell 112 is a hollow spherical semi-rigid structure. By semi-rigid structure is meant an elastic structure that will deform a force is applied to the shell 101 from a direction that is perpendicular to the center axis of the cylindrical shell 111. The shell 101 will return to its relaxed shape in an elastic manner once the applied force is removed. As shown most clearly in FIG. 1, the spherical shell 112 is mounted on the second base 132 of the cylindrical shell 111 in such a manner that the center axis of the cylindrical shell 111 passes through the center point of the spherical shell 112.

The shell 101 further comprises a first half structure 113 and a second half structure 114. While not technically mirror images, the first half structure 113 and the second half structure 114 are effectively divided along a reflective plane 134. The center axis of the cylindrical shell 111 lies on the reflective plane 134. The purpose of the first half structure 113 and the second half structure 114 is to separate the shell 101 in such a manner that the shell 101 can opened and closed around the knob 161. Once the knob 161 is in closed position, the shell 101 is secured in the closed position such that the shell 101 cannot be removed from the knob 161. The securing of the shell 101 is discussed elsewhere in this disclosure.

The first half structure 113 comprises a first semi-cylinder 115 and a first hemisphere 117. The first semi-cylinder 115 is formed the bisection of the cylindrical shell 111 by the reflective plane 134. The first hemisphere 117 is formed from the bisection of the spherical shell 112 by the reflective plane 134.

The first semi-cylinder 115 is formed with a first plate 120. The first plate 120 is a tab like structure that projects away from the exterior face 133 of the first semi-cylinder 115 along the reflective plane 134. The first plate 120 is further formed with a first aperture 123. The first aperture 123 is a hole formed through the center of the first plate 120. The first aperture 123 is further formed with a first interior screw thread. The use of the first aperture 123 is discussed elsewhere in this disclosure.

The second half structure 114 comprises a second semi-cylinder 116 and a second hemisphere 118. The second semi-cylinder 116 is formed the bisection of the cylindrical shell 111 by the reflective plane 134. The second hemisphere 118 is formed from the bisection of the spherical shell 112 by the reflective plane 134.

The second semi-cylinder 116 is formed with a second plate 121. The second plate 121 is a tab like structure that projects away from the exterior face 133 of the second semi-cylinder 116 along the reflective plane 134. The second plate 121 is further formed with a second aperture 124. The second aperture 124 is a hole formed through the center of the second plate 121. The second aperture 124 is further formed with a second interior screw thread. The use of the second aperture 124 is discussed elsewhere in this disclosure.

Figure 2:
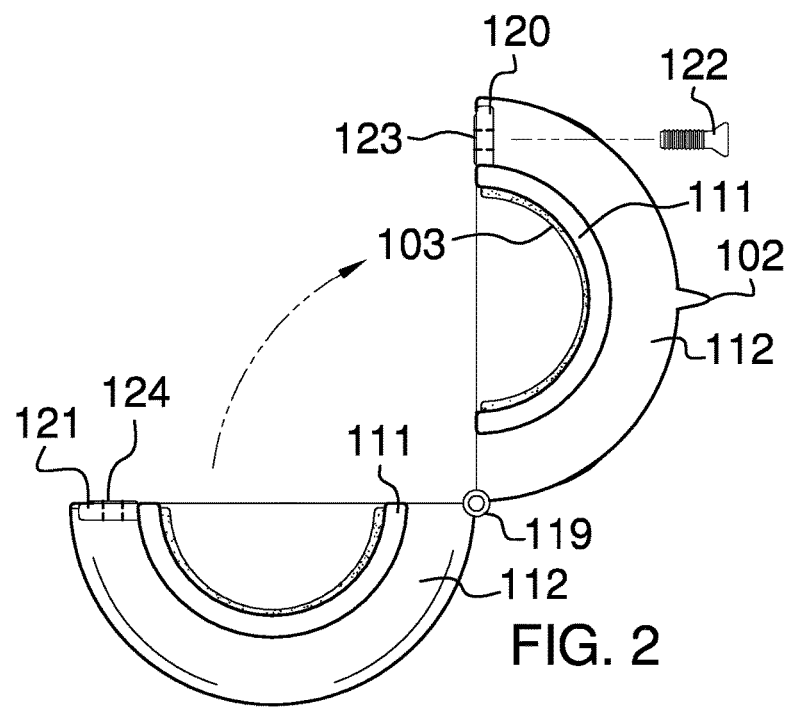
FIG. 2 is a back view of an embodiment of the disclosure.
Figure 3:
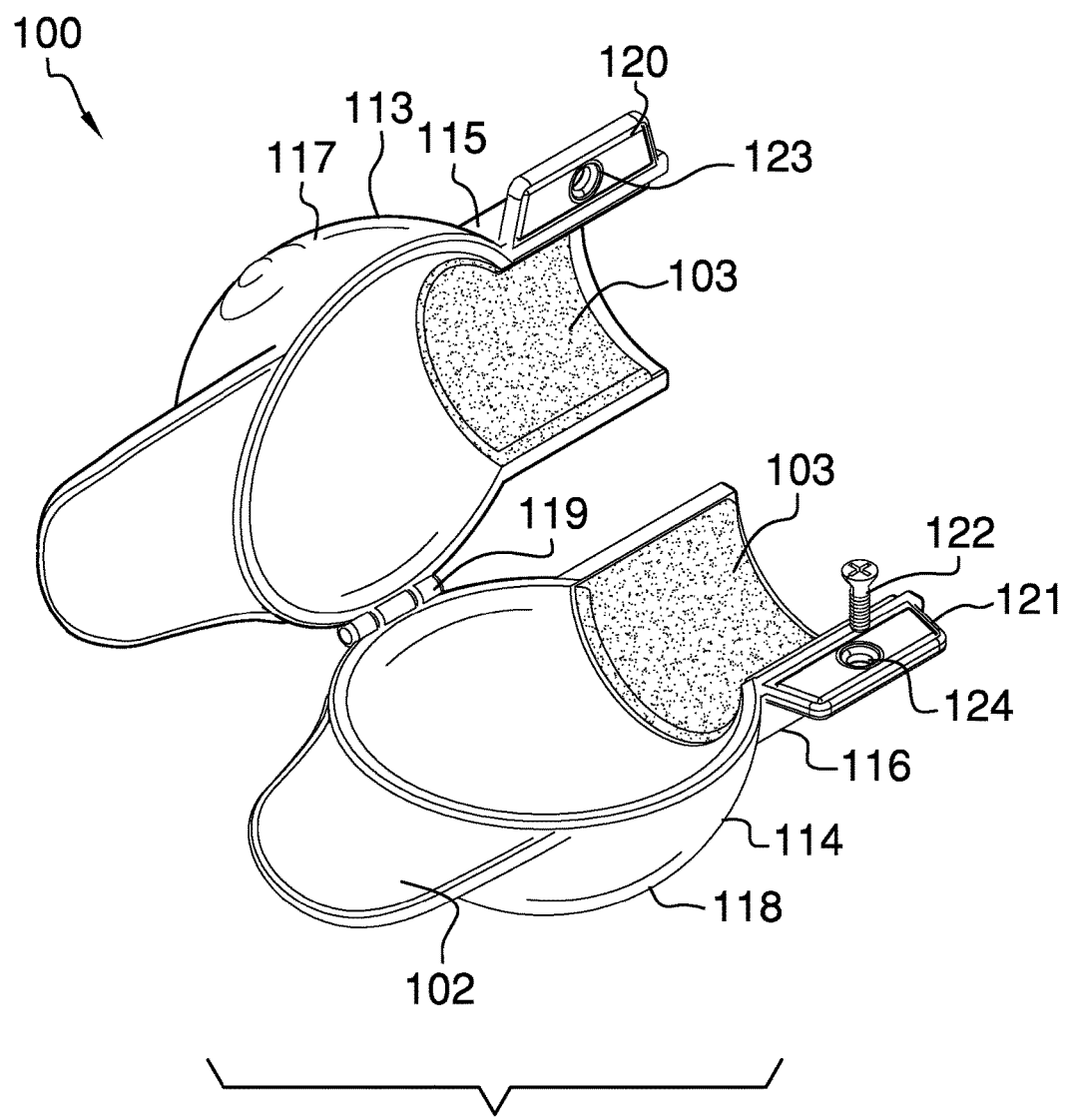
FIG. 3 is a detail view of an embodiment of the disclosure.
Figure 4:
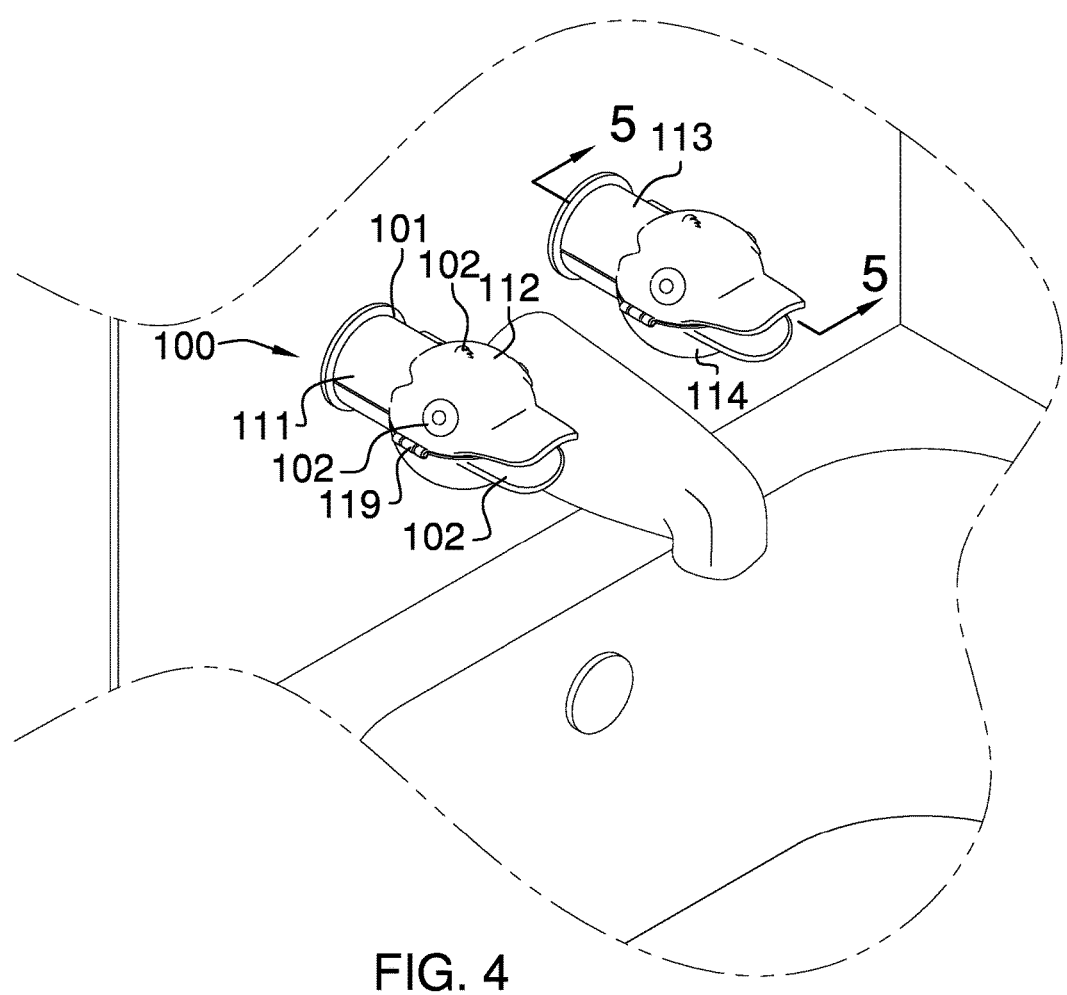
FIG. 4 is an in use view of an embodiment of the disclosure.

As shown most clearly in FIGS. 2, 3, and 4, the shell 101 further comprises a hinge 119 and a screw 122. The hinge 119 attaches the first half structure 113 to the second half structure 114 such that the first half structure 113 will rotate relative to the second structure 114 (or vice versa) using the hinge 119 as a pivot. Specifically, the hinge 119 attaches the first hemisphere 117 to the second hemisphere 118 such that the contour of the first half structure 113 along the reflective plane 134 aligns with the contour of the second half structure 114 along the reflective plane 134. The hinge 119 is positioned such that the hinge 119 attaches the first half structure 113 to the second half structure in such a manner that the first aperture 123 is aligned with the 124 second aperture when the first half structure 113 is rotated against the second half structure 114. The screw 122 is a readily and commercially available machine screw that is sized such that the screw can be screwed into an aperture selected from the group consisting of the first aperture 123 or the second aperture 124. The attachment and use of hinges 119 is well known and documented within the mechanical arts.

To close and secure the shell 101 to the knob 161, the first half structure 113 is rotated around the second half structure 114 in such a manner that the knob 161 is enclosed within the shell 101 when the contour of the first half structure 113 along the reflective plane 134 is in contact with the contour of the second half structure 114 along the reflective plane 134. The first half structure 113 is secured to the second half structure 114 by screwing the screw through the first aperture 123 and the second aperture 124 to form a threaded connection.

In a second potential embodiment of the disclosure, as shown most clearly in FIG. 5, the concave surface of the shell 101 is coated with a polyurethane foam padding 103.

In a third potential embodiment of the disclosure, one or more decorative elements 102 intended to divert and entertain children are attached to the convex surface of the cylindrical shell 111 and the spherical shell 112.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Center of Rotation: As used in this disclosure, the center of rotation is the point of a rotating plane that does not move with the rotation of the plane. A line within a rotating three dimensional object that does not move with the rotation of the object is referred to as an axis of rotation.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Decorative: As used in this disclosure, decorative is an adjective that refers to a first object or item that is used with a second object or item of the purpose of making the second object or item more attractive. Decorative will generally, but not necessarily, implies making the second object or item more attractive visually.

Diameter: As used in this disclosure, a diameter of an object is a straight line segment that passes through the center of an object. The line segment of the diameter is terminated at the perimeter or boundary of the object through which the line segment of the diameter runs.

Elastic: As used in this disclosure, an elastic is a material or object that deforms when a force is applied to it and that is able to return to its original shape after the force is removed. A material that exhibits these qualities is also referred to as an elastomeric material.

Exterior: As used in this disclosure, the exterior is use as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Hinge: As used in this disclosure, a hinge is a device that permits the turning, rotating, or pivoting of a first object relative to a second object.

Interior: As used in this disclosure, the interior is use as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Pad: As used in this disclosure, a pad is a mass of soft material used as a filling or for protection against damage or injury.

Pivot: As used in this disclosure, a pivot is a rod or shaft around which an object rotates or swings.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Relaxed Shape: As used in this disclosure, a structure is considered to be in its relaxed state when no shear, strain, or torsional forces are being applied to the structure.

Semi-Cylinder: As used in this disclosure, a semi-cylinder is half of a cylinder that is divided lengthwise such that the center axis of the cylinder is fully contained within the dividing plane.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Shell: As used in this disclosure, a shell is a structure that forms an outer covering intended to contain an object. Shells are often, but not necessarily, rigid or semi-rigid structures that are intended to protect the object contained within it.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A valve cover comprising:
   a shell and one or more decorative elements;
   wherein the valve cover is a safety device that covers a knob for a water valve associated with a bath tub;
   wherein the shell encloses the knob;
   wherein the one or more decorative elements are placed on the shell;
   wherein the valve cover fits over the knob in such a manner that the valve cover will rotate around the knob unless the valve cover is squeezed while being turned;
   wherein the shell comprises a cylindrical shell;
   wherein the cylindrical shell is a hollow cylindrical semi-rigid structure that is further defined with a first base, a second base, and a face;
   wherein the first base and the second base are open;
   wherein the shell comprises a cylindrical shell and a spherical shell;
   wherein the spherical shell is a hollow spherical semi-rigid structure;
   wherein the semi-rigid structure is an elastic structure;
   wherein the spherical shell is mounted on the second base of the cylindrical shell in such a manner that the center axis of the cylindrical shell passes through the center point of the spherical shell;
   wherein the shell further comprises a first half structure and a second half structure;
   wherein the first half structure and the second half structure are divided along a reflective plane;
   wherein the center axis of the cylindrical shell lies on the reflective plane;
   wherein the first half structure and the second half structure separate the shell in such a manner that the shell wraps around the knob;
   wherein the first half structure comprises a first semi-cylinder and a first hemisphere;
   wherein the first semi-cylinder is formed the bisection of the cylindrical shell by the reflective plane;
   wherein the first hemisphere is formed from the bisection of the spherical shell by the reflective plane;
   wherein the first semi-cylinder is formed with a first plate;
   wherein the first plate projects away from the exterior face of the first semi-cylinder along the reflective plane.

2. The valve cover according to claim 1
   wherein the first plate is further formed with a first aperture;
   wherein the first aperture is a hole formed through the center of the first plate;
   wherein the first aperture is further formed with a first interior screw thread.

3. The valve cover according to claim 2
   wherein the second half structure comprises a second semi-cylinder and a second hemisphere;

wherein the second semi-cylinder is formed the bisection of the cylindrical shell by the reflective plane;

wherein the second hemisphere is formed from the bisection of the spherical shell by the reflective plane.

4. The valve cover according to claim 3
wherein the second semi-cylinder is formed with a second plate;
wherein the second plate projects away from the exterior face of the second semi-cylinder along the reflective plane;
wherein the second plate is further formed with a second aperture;
wherein the second aperture is a hole formed through the center of the second plate;
wherein the second aperture is further formed with a second interior screw thread.

5. The valve cover according to claim 4 wherein the hinge attaches the first half structure to the second half structure such that the first half structure will rotate relative to the second structure using the hinge as a pivot.

6. The valve cover according to claim 5 wherein the hinge attaches the first hemisphere to the second hemisphere such that the contour of the first half structure along the reflective plane aligns with the contour of the second half structure along the reflective plane.

7. The valve cover according to claim 6 wherein the hinge is positioned such that the hinge attaches the first half structure to the second half structure in such a manner that the first aperture is aligned with the second aperture when the first half structure is rotated against the second half structure.

8. The valve cover according to claim 7
wherein the shell further comprises a screw;
wherein the screw is a machine screw;
wherein the screw is sized such that the screw can be screwed into an aperture selected from the group consisting of the first aperture or the second aperture.

9. The valve cover according to claim 8
wherein to secure the shell to the knob the first half structure is rotated around the second half structure in such a manner that the knob is enclosed within the shell when the contour of the first half structure along the reflective plane is in contact with the contour of the second half structure along the reflective plane;
wherein to secure the shell to the knob the first half structure is secured to the second half structure by screwing the screw through the first aperture and the second aperture.

10. The valve cover according to claim 9 wherein the interior surface of the shell is coated with a foam padding.

11. The valve cover according to claim 10
wherein one or more decorative elements are attached to the exterior surface of the cylindrical shell;
wherein one or more decorative elements are attached to the exterior surface of the spherical shell.

* * * * *